US012344951B2

(12) United States Patent
Koponen et al.

(10) Patent No.: US 12,344,951 B2
(45) Date of Patent: Jul. 1, 2025

(54) SYSTEM AND A METHOD FOR ALKALINE WATER ELECTROLYSIS

(71) Applicant: LAPPEENRANNAN-LAHDEN TEKNILLINEN YLIOPISTO LUT, Lappeenranta (FI)

(72) Inventors: Joonas Koponen, Lappeenranta (FI); Vesa Ruuskanen, Lappeenranta (FI); Antti Kosonen, Lappeenranta (FI); Anton Poluektov, Lappeenranta (FI); Jero Ahola, Lappeenranta (FI); Markku Niemelä, Lappeenranta (FI); Tuomo Lindh, Lappeenranta (FI)

(73) Assignee: LAPPEENRANNAN-LAHDEN TEKNILLINEN YLIOPISTO LUT, Lappeenranta (FI)

( * ) Notice: Subject to any disclaimer, the term of this patent is extended or adjusted under 35 U.S.C. 154(b) by 469 days.

(21) Appl. No.: 17/642,558

(22) PCT Filed: Jun. 23, 2020

(86) PCT No.: PCT/FI2020/050446
§ 371 (c)(1),
(2) Date: Mar. 11, 2022

(87) PCT Pub. No.: WO2021/048461
PCT Pub. Date: Mar. 18, 2021

(65) Prior Publication Data
US 2022/0325425 A1     Oct. 13, 2022

(30) Foreign Application Priority Data
Sep. 12, 2019   (FI) .................................... 20195758

(51) Int. Cl.
*C25B 9/13*     (2021.01)
*C25B 1/04*     (2021.01)
(Continued)

(52) U.S. Cl.
CPC .................. *C25B 9/13* (2021.01); *C25B 1/04* (2013.01); *C25B 9/77* (2021.01); *C25B 15/08* (2013.01)

(58) Field of Classification Search
CPC .............. C25B 1/04; C25B 9/77; C25B 15/08
See application file for complete search history.

(56) References Cited

U.S. PATENT DOCUMENTS

2007/0234900 A1   10/2007   Soloveichik et al.
2009/0166191 A1*   7/2009   Sato .......................... C25B 1/04
                                                                    204/278
(Continued)

FOREIGN PATENT DOCUMENTS

CN     108 862 533          11/2018
DE     102007051230 A1 *    7/2008 ............... C25B 1/12
(Continued)

OTHER PUBLICATIONS

International Search Report for PCT/FI2020/050446 mailed Oct. 15, 2020, 4 pages.
(Continued)

*Primary Examiner* — Ciel P Contreras
(74) *Attorney, Agent, or Firm* — NIXON & VANDERHYE

(57) ABSTRACT

A system for alkaline water electrolysis includes electrolysis cells, a hydrogen separator tank, a first piping from the electrolysis cells to the hydrogen separator tank, an oxygen separator tank, a second piping from the electrolysis cells to the oxygen separator tank, and a third piping for conducting liquid electrolyte from the hydrogen separator tank and from the oxygen separator tank back to the electrolysis cells. The system includes an ultrasound source for applying ultrasound on the liquid electrolyte contained by the first piping. The ultrasound enhances the separation of dissolved hydrogen gas from the liquid electrolyte contained by the first (Continued)

piping, and thus energy efficiency of the alkaline water electrolysis is improved. Furthermore, a safe control range of the alkaline water electrolysis is broadened because crossover of hydrogen gas to an oxygen side of the system is reduced.

19 Claims, 3 Drawing Sheets

(51) Int. Cl.
    *C25B 9/77*     (2021.01)
    *C25B 15/08*     (2006.01)

(56) References Cited

U.S. PATENT DOCUMENTS

| | | |
|---|---|---|
| 2012/0063967 A1 | 3/2012 | Tokuhiro et al. |
| 2012/0175268 A1 | 7/2012 | Joshi et al. |
| 2014/0072836 A1* | 3/2014 | Mills .................... H01M 14/00 429/422 |
| 2015/0114842 A1* | 4/2015 | Sato ........................ C25B 1/04 204/229.1 |
| 2016/0060776 A1* | 3/2016 | Kawajiri .................. C25B 9/00 205/637 |
| 2018/0195183 A1* | 7/2018 | Domon ................... C25B 15/08 |

FOREIGN PATENT DOCUMENTS

| | | | |
|---|---|---|---|
| JP | 8-89967 | 4/1996 | |
| JP | 2003313693 A * | 11/2003 | ............ Y02E 60/36 |
| JP | 2011-6769 | 1/2011 | |
| JP | 2015-000354 | 1/2015 | |
| JP | 2018-001069 | 1/2018 | |
| WO | 2018/074811 | 4/2018 | |
| WO | 2019/049265 | 3/2019 | |

OTHER PUBLICATIONS

Written Opinion of the ISA for PCT/FI2020/050446 mailed Oct. 15, 2020, 7 pages.
Islam et al., "Sonochemical and sonoelectrochemical production of hydrogen", Ultrasonics—Sonochemistry, vol. 51, 2019, pp. 533-555.

* cited by examiner

SYSTEM AND A METHOD FOR ALKALINE WATER ELECTROLYSIS

This application is the U.S. national phase of International Application No. PCT/FI2020/050446 filed Jun. 23, 2020 which designated the U.S. and claims priority to FI 20195758 filed Sep. 12, 2019, the entire contents of each of which are hereby incorporated by reference.

FIELD OF THE DISCLOSURE

The disclosure relates generally to electrolysis for decomposing water into oxygen and hydrogen with the aid of electric current. More particularly, the disclosure relates to a system and to a method for alkaline water electrolysis.

BACKGROUND

Alkaline water electrolysis is a widely used type of electrolysis where electrodes operate in alkaline liquid electrolyte that may comprise e.g. aqueous potassium hydroxide "KOH" or aqueous sodium hydroxide "NaOH". The electrodes are separated by a porous diaphragm that is non-conductive to electrons, thus avoiding electrical shorts between the electrodes while allowing a small distance between the electrodes. The porous diaphragm further avoids a mixing of produced hydrogen gas $H_2$ and oxygen gas $O_2$. The ionic conductivity needed for electrolysis is caused by hydroxide ions OH— which are able to penetrate the porous diaphragm.

A system for alkaline water electrolysis comprises electrolysis cells each of which comprises an anode, a cathode, and a porous diaphragm of the kind mentioned above. The porous diaphragm divides each electrolysis cell into a cathode compartment containing the cathode and an anode compartment containing the anode. Typically, the system further comprises a hydrogen separator tank, a first piping from the cathode compartments of the electrolysis cells to an upper portion of the hydrogen separator tank, an oxygen separator tank, and a second piping from the anode compartments of the electrolysis cells to an upper portion of the oxygen separator tank. Furthermore, the system comprises typically a third piping for conducting liquid electrolyte from a lower portion of the hydrogen separator tank and from a lower portion of the oxygen separator tank back to the electrolysis cells. In the hydrogen and oxygen separator tanks, hydrogen and oxygen gases are separated as gases continue to rise upwards and the liquid electrolyte returns to an electrolyte cycle. The electrolyte cycle may be pump-controlled, especially when temperature control is desirable, but a gravitational electrolyte circulation is possible as well.

The energy efficiency of an alkaline water electrolysis process is reduced by crossover of hydrogen gas to the anode compartments, i.e. to the oxygen side. Furthermore, the energy efficiency is reduced by stray currents taking place in the electrolysis system. The energy efficiency can be expressed in terms of e.g. mass of hydrogen gas produced with a given amount of energy. The crossover of hydrogen gas to the anode compartments as well as the crossover of oxygen gas to the cathode compartments, i.e. to the hydrogen side, can be caused by diffusive and convective mass transfer mechanisms. The convective mass transfer mechanisms can be further categorized into differential pressure, electro-osmotic drag, and electrolyte mixing gas crossover. In an alkaline water electrolysis process, anodic and cathodic electrolyte cycles are typically mixed together to balance an electrolyte concentration gradient and therefore the electrolyte mixing gas crossover has typically the greatest impact. Generally, increase in operating pressure and decrease in current density decrease a cathodic hydrogen output and, on the other hand, increase a proportion of hydrogen gas in an oxygen gas outlet. As the hydrogen gas in the oxygen gas outlet is a safety issue, the crossover of the hydrogen gas to the oxygen side sets, for a given operating pressure, a minimum current level at which a system for alkaline water electrolysis can be safely operated. Therefore, the crossover of the hydrogen gas to the oxygen side reduces the energy efficiency and, in addition, limits a safe control range of the alkaline water electrolysis process.

SUMMARY

The following presents a simplified summary in order to provide a basic understanding of some aspects of various embodiments. The summary is not an extensive overview of the invention. It is neither intended to identify key or critical elements of the invention nor to delineate the scope of the invention. The following summary merely presents some concepts in a simplified form as a prelude to a more detailed description of exemplifying and non-limiting embodiments.

In accordance with the invention, there is provided a new system for alkaline water electrolysis. A system according to the invention comprises:
- one or more electrolysis cells each comprising an anode, a cathode, and a porous diaphragm dividing the electrolysis cell into a cathode compartment containing the cathode and an anode compartment containing the anode,
- a hydrogen separator tank and a first piping from the cathode compartments of the electrolysis cells to an upper portion of the hydrogen separator tank,
- an oxygen separator tank and a second piping from the anode compartments of the electrolysis cells to an upper portion of the oxygen separator tank,
- a third piping for conducting liquid electrolyte from a lower portion of the hydrogen separator tank and from a lower portion of the oxygen separator tank to the electrolysis cells, and
- an ultrasound source attached to the first piping and being configured to apply ultrasound on the liquid electrolyte contained by the first piping.

The ultrasound enhances the separation of dissolved hydrogen gas from the liquid electrolyte contained by the above-mentioned first piping. Therefore, crossover of the hydrogen gas to the oxygen side is reduced. As a corollary, the energy efficiency of the system is improved, and the safe control range of the system is broadened.

In many existing systems for alkaline water electrolysis, a piping from cathode compartments of electrolysis cells to a hydrogen separator tank is mechanically arranged so that it is straightforward to retrofit an existing system with an ultrasound source in accordance with the invention.

In accordance with the invention, there is provided also a new method for alkaline water electrolysis. A method according to the invention comprises:
- conducting electric current to electrolysis cells each comprising an anode, a cathode, and a porous diaphragm dividing the electrolysis cell into a cathode compartment containing the cathode and an anode compartment containing the anode, and
- applying ultrasound on liquid electrolyte contained by a piping conducting hydrogen gas and the liquid electrolyte from the cathode compartments of the electrolysis cells to an upper portion of a hydrogen separator tank so as to separate dissolved hydrogen gas from the liquid electrolyte contained by the piping.

Exemplifying and non-limiting embodiments are described in accompanied dependent claims.

Various exemplifying and non-limiting embodiments both as to constructions and to methods of operation, together with additional objects and advantages thereof, will be best understood from the following description of specific exemplifying and non-limiting embodiments when read in conjunction with the accompanying drawings.

The verbs "to comprise" and "to include" are used in this document as open limitations that neither exclude nor require the existence of unrecited features. The features recited in dependent claims are mutually freely combinable unless otherwise explicitly stated. Furthermore, it is to be understood that the use of "a" or "an", i.e. a singular form, throughout this document does not exclude a plurality.

BRIEF DESCRIPTION OF THE FIGURES

Exemplifying and non-limiting embodiments and their advantages are explained in greater detail below in the sense of examples and with reference to the accompanying drawings, in which.

DESCRIPTION OF THE EXEMPLIFYING EMBODIMENTS

The specific examples provided in the description given below should not be construed as limiting the scope and/or the applicability of the appended claims. Lists and groups of examples provided in the description given below are not exhaustive unless otherwise explicitly stated.

Figure 1A:
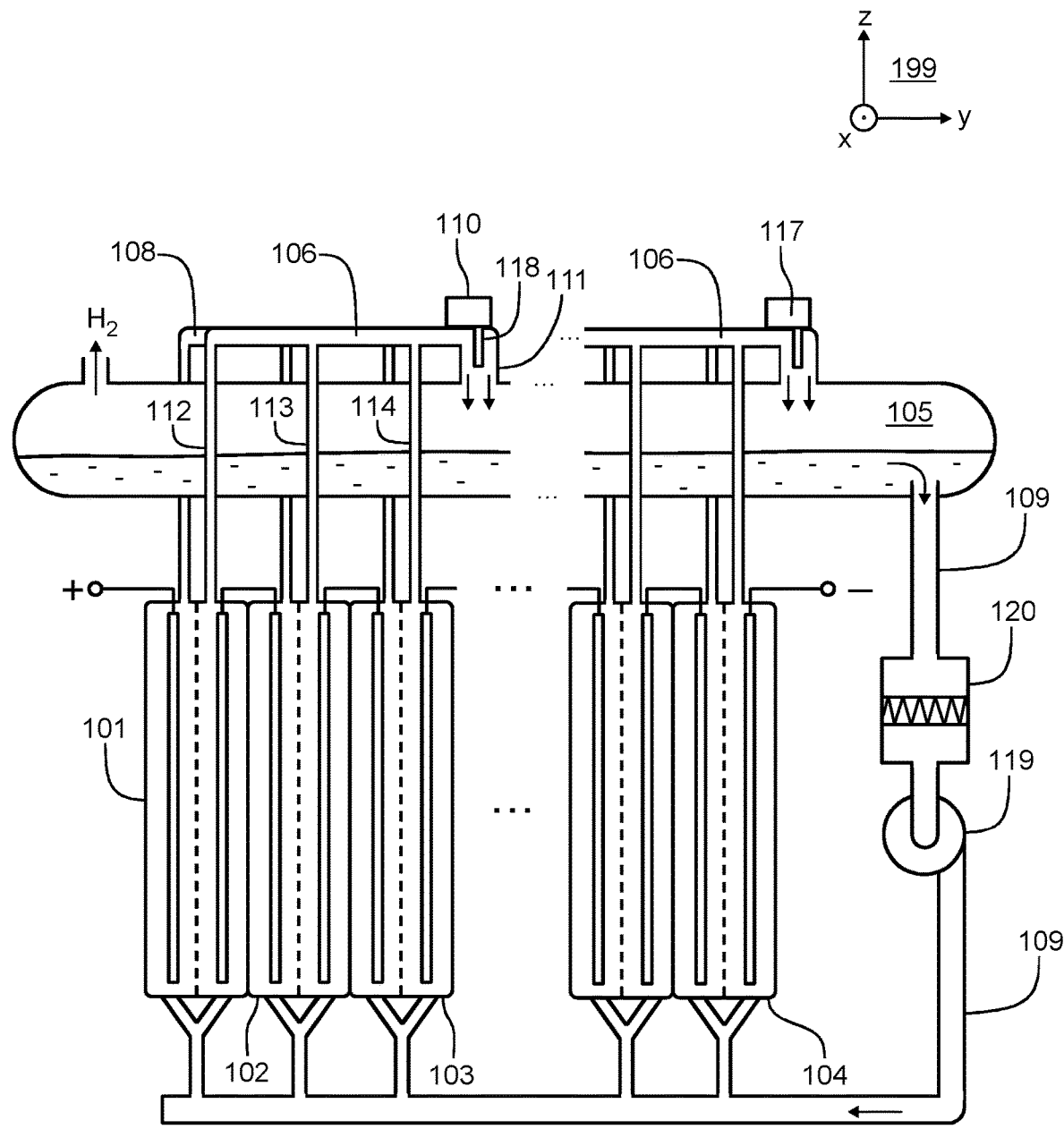
FIGS. 1a and 1b illustrate a system according to an exemplifying and non-limiting embodiment for alkaline water electrolysis.
Figure 1B:
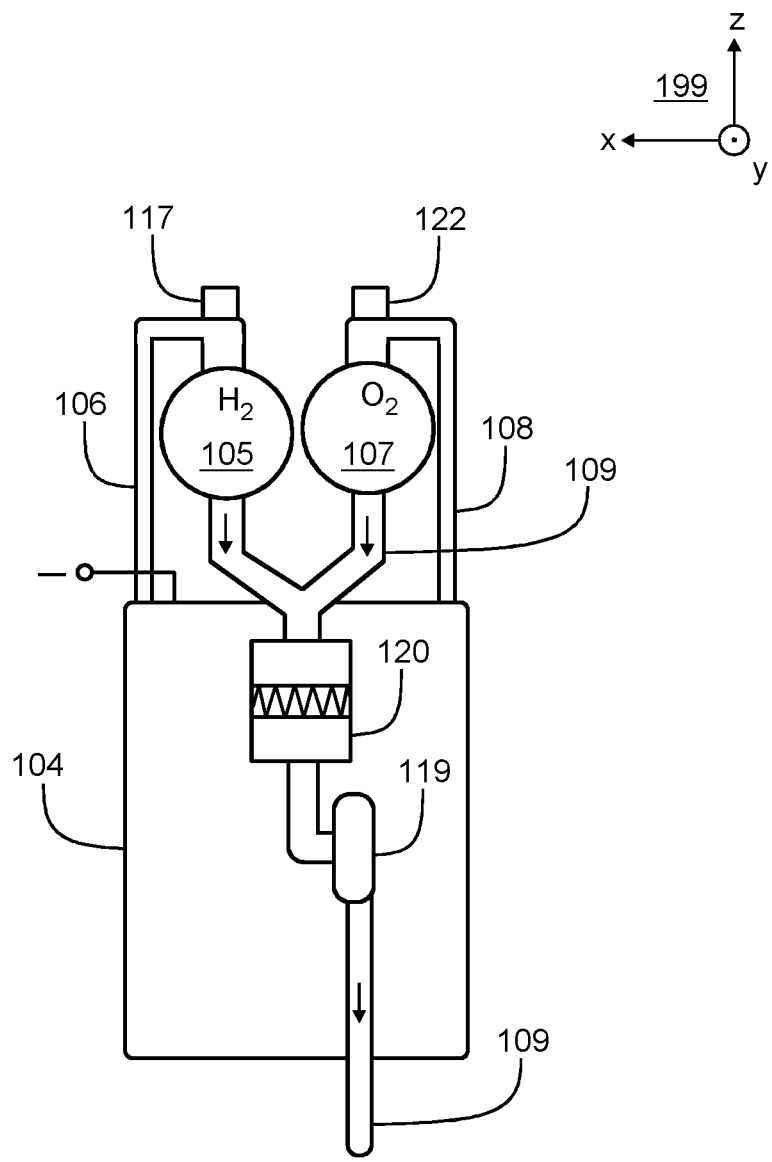

FIGS. 1a and 1b illustrate a system according to an exemplifying and non-limiting embodiment for alkaline water electrolysis. Viewing directions related to FIGS. 1a and 1b are expressed with the aid of a coordinate system 199. The system comprises a stack of electrolysis cells each of which contains alkaline liquid electrolyte. In FIG. 1a, four of the electrolysis cells are denoted with references 101, 102, 103, and 104. Each of the electrolytic cells comprises an anode, a cathode, and a porous diaphragm dividing the electrolysis cell into a cathode compartment containing the cathode and an anode compartment containing the anode. The liquid electrolyte may comprise e.g. aqueous potassium hydroxide "KOH" or aqueous sodium hydroxide "NaOH". The system may comprise e.g. tens or even hundreds of electrolysis cells. It is however also possible that a system according to an exemplifying and non-limiting embodiment comprises from one to ten electrolysis cells. In the exemplifying system illustrated in FIGS. 1a and 1b, the electrolysis cells are electrically series connected. It is however also possible that electrolytic cells of a system according to an exemplifying and non-limiting embodiment are electrically parallel connected, or the electrolytic cells are arranged to constitute series connected groups of parallel connected electrolytic cells, or parallel connected groups of series connected electrolytic cells, or the electrolytic cells are electrically connected to each other in some other way.

The system comprises a hydrogen separator tank 105 and a first piping 106 from the cathode compartments of the electrolysis cells to an upper portion of the hydrogen separator tank 105. The system comprises an oxygen separator tank and a second piping 108 from the anode compartments of the electrolysis cells to an upper portion of the oxygen separator tank. In FIG. 1b, the oxygen separator tank is denoted with a reference 107. The system comprises a third piping 109 for circulating the liquid electrolyte from a lower portion of the hydrogen separator tank 105 and from a lower portion of the oxygen separator tank 107 back to the electrolysis cells. In the hydrogen and oxygen separator tanks 105 and 107, hydrogen and oxygen gases $H_2$ and $O_2$ are separated as gases continue to rise upwards and the liquid electrolyte returns to the electrolyte cycle.

In the exemplifying system illustrated in FIGS. 1a and 1b, the third piping 109 comprises a controllable pump 119 for pumping the liquid electrolyte to the electrolysis cells. A pump-controlled electrolyte cycle is advantageous especially when temperature control is needed. It is however also possible that a system according to an exemplifying and non-limiting embodiment comprises a gravitational electrolyte circulation. In the exemplifying system illustrated in FIGS. 1a and 1b, the third piping 109 further comprises a filter 120 for filtering the liquid electrolyte. The filter 120 can be for example a membrane filter for removing impurities from the liquid electrolyte.

The hydrogen production rate $dn_{H2}/dt$, mol s$^{-1}$, of each electrolytic cell of the above-described system is linearly proportional to the electric current $I_{cell}$ as follows:

$$dn_{H2}/dt = \eta_F j_{cell} A_{cell}/(zF) = \eta_F I_{cell}/(zF), \quad (1)$$

where $\eta_F$ is the Faraday efficiency, also known as the current efficiency, $j_{cell}$ is the current density, Acm$^{-2}$, $A_{cell}$ is the effective cell area, cm$^2$, z is the number of moles of electrons transferred in the reaction, for hydrogen z=2, and F is the Faraday constant≈9.6485×10$^4$ C mol$^{-1}$.

In order to maximize the energy efficiency of an alkaline water electrolysis process, the above-mentioned Faraday efficiency $\eta_F$ i.e. the ratio of the ideal hydrogen production rate to an actual hydrogen production rate should be as close to one as possible at all operating conditions. The Faraday efficiency decreases due to crossover of hydrogen gas to the anode compartments, i.e. to the oxygen side. Furthermore, the Faraday efficiency is reduced by stray currents taking place in the system for alkaline water electrolysis.

The system comprises an ultrasound source 110 attached to the first piping 106 and configured to apply ultrasound on the liquid electrolyte contained by the first piping 106. The frequency of the ultrasound can be for example in the range from 16 kHz to 200 kHz. The ultrasound enhances the separation of dissolved hydrogen gas $H_2$ from the liquid electrolyte contained by the above-mentioned first piping 106. Therefore, the crossover of the hydrogen gas to the oxygen side is reduced. As a corollary, the Faraday efficiency of the system is improved. Furthermore, the safe control range of the system is broadened because the reduction in the hydrogen gas crossover reduces the amount of hydrogen gas on the oxygen side and thereby reduces a lower limit of the electric current and increases an upper limit of the operating pressure which correspond to a maximum allowable hydrogen content on the oxygen side.

In the exemplifying system illustrated in FIGS. 1a and 1b, the ultrasound source 110 comprises an ultrasound radiator 118 that is inside the first piping 106. It is also possible that an ultrasound radiator is attached to an outer wall of the first piping 106, or there is some other arrangement for conducting ultrasound waves to the liquid electrolyte contained by the first piping 106.

In the exemplifying system illustrated in FIGS. 1a and 1b, the first piping is arranged form manifolds each of which comprises a collector pipe connected to the hydrogen separator tank 105 and branch pipes connected to the collector pipe and to the cathode compartments of three of the electrolysis cells. The system comprises one ultrasound source per each manifold so that the ultrasound source related to a manifold under consideration is attached to the collector pipe of the manifold. In the exemplifying case illustrated in FIGS. 1a and 1b, the cathode compartments of the electrolysis cells 101-103 are connected to the hydrogen separator tank 105 with a manifold that comprises the branch pipes 112, 113, and 114 and the collector pipe 111. The ultrasound source 110 is attached to the collector pipe 111. Correspondingly, the cathode compartments of three other electrolysis cells, including the electrolysis cell 104, are connected to the hydrogen separator tank 105 with another manifold, and an ultrasound source 117 is attached to the collector pipe of this manifold. It is to be noted that the above-described mechanical arrangement of the first piping is a non-limiting example only, many different mechanical arrangements of the first piping being possible in systems according to exemplifying and non-limiting embodiments.

In the exemplifying system illustrated in FIGS. 1a and 1b, the second piping 108 from the anode compartments of the electrolysis cells to the oxygen separator tank is provided with ultrasound sources in the same way as the first piping from the cathode compartments of the electrolysis cells to the hydrogen separator tank 105. In FIG. 1b, one of the ultrasound sources attached to the second piping 108 is denoted with a reference 122. The ultrasound sources attached to the second piping 108 enhance the separation of dissolved oxygen gas from the liquid electrolyte contained by the second piping 108. Therefore, crossover of the oxygen gas to the hydrogen side is reduced. It is however also possible that a system according to an exemplifying and non-limiting embodiment comprises one or more ultrasound sources on the hydrogen side only.

Figure 2:
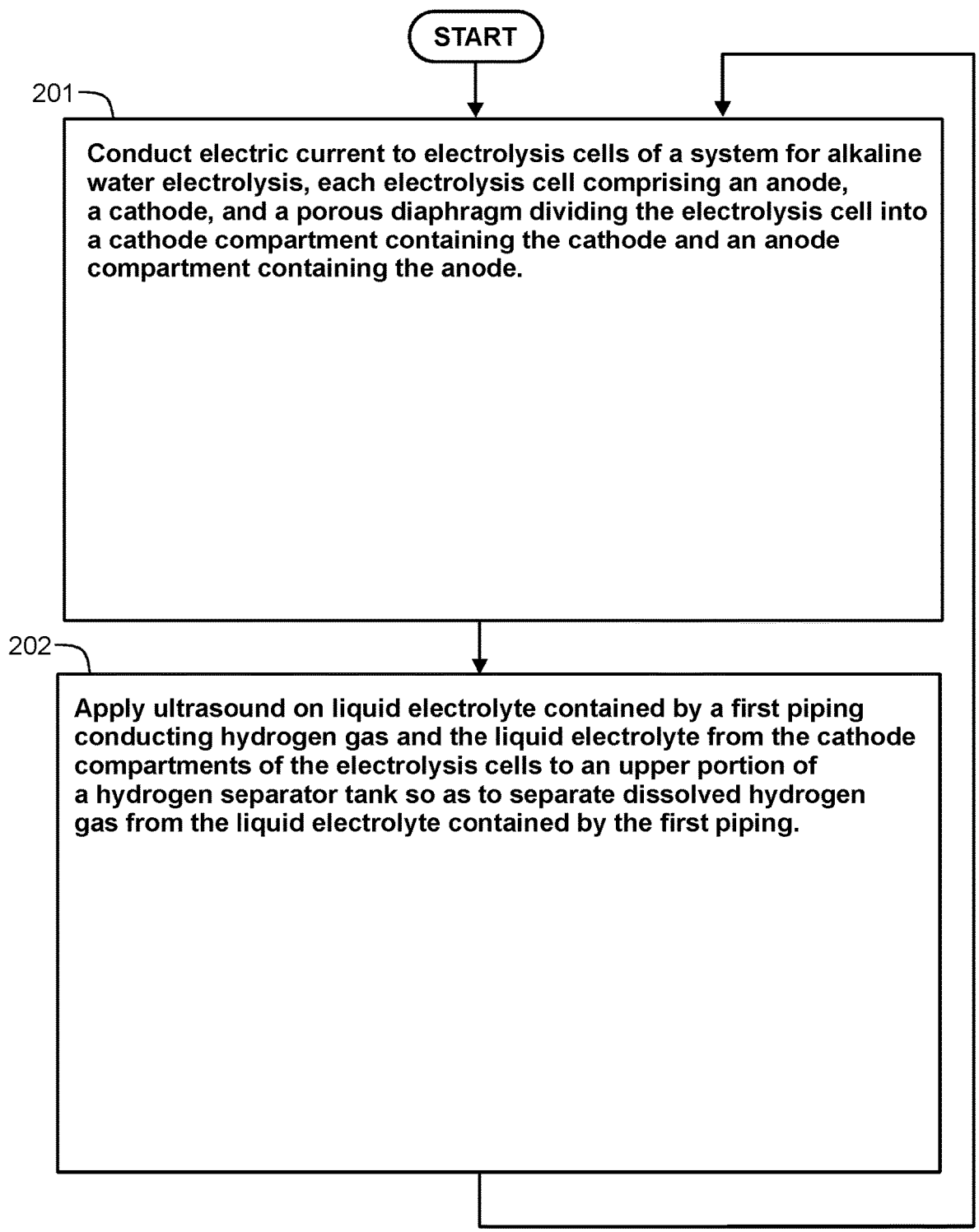
FIG. 2 shows a flowchart of a method according to an exemplifying and non-limiting embodiment for alkaline water electrolysis.

FIG. 2 shows a flowchart of a method according to an exemplifying and non-limiting embodiment for alkaline water electrolysis. The method comprises the following actions:

action 201: conducting electric current to electrolysis cells each comprising an anode, a cathode, and a porous diaphragm dividing the electrolysis cell into a cathode compartment containing the cathode and an anode compartment containing the anode, and action 202: applying ultrasound on liquid electrolyte contained by a first piping conducting hydrogen gas and the liquid electrolyte from the cathode compartments of the electrolysis cells to an upper portion of a hydrogen separator tank so as to separate dissolved hydrogen gas from the liquid electrolyte contained by the first piping.

In a method according to an exemplifying and non-limiting embodiment, the above-mentioned first piping forms a manifold comprising a collector pipe connected to the hydrogen separator tank and branch pipes connected to the collector pipe and to the cathode compartments of two or more of the electrolysis cells, and the ultrasound is applied on the liquid electrolyte contained by the collector pipe.

In a method according to an exemplifying and non-limiting embodiment, the above-mentioned first piping forms at least one other manifold comprising another collector pipe connected to the hydrogen separator tank and other branch pipes connected to the other collector pipe and to the cathode compartments of other two or more of the electrolysis cells. In this exemplifying case, the method comprises applying ultrasound also on the liquid electrolyte contained by the other collector pipe.

A method according to an exemplifying and non-limiting embodiment comprises applying ultrasound on the liquid electrolyte contained by a second piping conducting oxygen gas and the liquid electrolyte from the anode compartments of the electrolysis cells to an upper portion of an oxygen separator tank so as to separate dissolved oxygen gas from the liquid electrolyte contained by the second piping.

In a method according to an exemplifying and non-limiting embodiment, the liquid electrolyte comprises aqueous potassium hydroxide "KOH".

In a method according to an exemplifying and non-limiting embodiment, the liquid electrolyte comprises aqueous sodium hydroxide "NaOH".

The specific examples provided in the description given above should not be construed as limiting the applicability and/or the interpretation of the appended claims. Lists and groups of examples provided in the description given above are not exhaustive unless otherwise explicitly stated.

What is claimed is:

1. A system for alkaline water electrolysis, the system comprising:
    one or more electrolysis cells, each electrolysis cell comprising an anode, a cathode, and a porous diaphragm dividing the electrolysis cell into a cathode compartment containing the cathode and an anode compartment containing the anode,
    a hydrogen separator tank,
    a first piping from the one or more cathode compartments of the electrolysis cells to a collector pipe located at an upper portion of the hydrogen separator tank, the hydrogen separator tank having a first outlet for hydrogen,
    an oxygen separator tank,
    a second piping from the one or more anode compartments of the one or more electrolysis cells to an upper portion of the oxygen separator tank, the oxygen separator tank having a second outlet for oxygen and the first and second outlets being separate from each other,
    a third piping for conducting liquid electrolyte from a lower portion of the hydrogen separator tank and from a lower portion of the oxygen separator tank to the electrolysis cells, and
    an ultrasound source attached to the first piping at the collector pipe located at the upper portion of the hydrogen separator tank and for applying ultrasound on the liquid electrolyte contained by the first piping at the collector pipe to separate dissolved hydrogen gas from the liquid electrolyte contained by the first piping at the collector pipe.

2. The system according to claim 1, wherein the one or more electrolysis cells comprise plural electrolysis cells, and the first piping is arranged to form a manifold comprising the collector pipe connected to the hydrogen separator tank and branch pipes connected to the collector pipe and to the cathode compartments of two or more of the plural electrolysis cells, the ultrasound source being attached to the collector pipe.

3. The system according to claim 2, wherein the first piping is arranged to form at least one other manifold comprising another collector pipe connected to the hydrogen separator tank and other branch pipes connected to the other collector pipe and to the cathode compartments of other two or more of the plural electrolysis cells, and the system further comprises at least one other ultrasound source attached to the other collector pipe.

4. The system according to claim 1, wherein the ultrasound source comprises an ultrasound radiator inside the first piping.

5. The system according to claim 1, wherein the third piping comprises a controllable pump for pumping the liquid electrolyte to the one or more electrolysis cells.

6. The system according to claim 1, wherein the third piping comprises a filter for filtering the liquid electrolyte.

7. The system according to claim 1, wherein the one or more electrolysis cells comprise plural electrolysis cells, and the plural electrolysis cells are electrically series connected.

8. The system according to claim 1, wherein the one or more electrolysis cells comprise plural electrolysis cells, and the plural electrolysis cells are electrically parallel connected.

9. The system according to claim 1, wherein the system comprises an ultrasound source attached to the second piping and for applying ultrasound on the liquid electrolyte contained by the second piping to separate dissolved oxygen gas from the liquid electrolyte contained by the second piping.

10. The system according to claim 2, wherein the ultrasound source comprises an ultrasound radiator inside the first piping.

11. The system according to claim 3, wherein the ultrasound source comprises an ultrasound radiator inside the first piping.

12. The system according to claim 2, wherein the third piping comprises a controllable pump for pumping the liquid electrolyte to the plural electrolysis cells.

13. The system according to claim 3, wherein the third piping comprises a controllable pump for pumping the liquid electrolyte to the plural electrolysis cells.

14. The system according to claim 4, wherein the third piping comprises a controllable pump for pumping the liquid electrolyte to the plural electrolysis cells.

15. A method for alkaline water electrolysis, the method comprising:
conducting electric current to electrolysis cells each comprising an anode, a cathode, and a porous diaphragm dividing the electrolysis cell into a cathode compartment containing the cathode and an anode compartment containing the anode, a first piping conducting hydrogen gas and liquid electrolyte from the cathode compartments of the electrolysis cells to an upper portion of a hydrogen separator tank and a second piping conducting oxygen gas and the liquid electrolyte from the anode compartments of the electrolysis cells to an upper portion of an oxygen separator tank, and
applying ultrasound on the liquid electrolyte contained by the first piping so as to separate dissolved hydrogen gas from the liquid electrolyte contained by the first piping,
wherein the hydrogen separator tank has a first outlet for hydrogen, the oxygen separator tank having a second outlet for oxygen, and the first and second outlets are separate from each other,
wherein the first piping forms a manifold comprising a collector pipe connected to the hydrogen separator tank and branch pipes connected to the collector pipe and to the cathode compartments of two or more of the electrolysis cells, the ultrasound being applied on the liquid electrolyte contained by the collector pipe.

16. The method according to claim 15, wherein the first piping forms at least one other manifold comprising another collector pipe connected to the hydrogen separator tank and other branch pipes connected to the other collector pipe and to the cathode compartments of other two or more of the electrolysis cells, and the method comprises applying ultrasound on the liquid electrolyte contained by the other collector pipe.

17. The method according to claim 15, wherein the method comprises applying ultrasound on the liquid electrolyte contained by the second piping so as to separate dissolved oxygen gas from the liquid electrolyte contained by the second piping.

18. The method according to claim 15, wherein the liquid electrolyte comprises aqueous potassium hydroxide.

19. The method according to claim 15, wherein the liquid electrolyte comprises aqueous sodium hydroxide.

* * * * *